United States Patent [19]

Coleman

[11] E Re. 29,006

[45] Reissued Oct. 19, 1976

[54] DISPLAY DEVICE

[76] Inventor: Kelly R. Coleman, 1910 Saddle Hill Rd. So., Riverview, Fla. 33528

[22] Filed: May 19, 1975

[21] Appl. No.: 578,804

Related U.S. Patent Documents

Reissue of:

[64] Patent No.: 3,702,033
Issued: Nov. 7, 1972
Appl. No.: 155,770
Filed: June 23, 1971

U.S. Applications:

[63] Continuation of Ser. No. 410,305, Oct. 29, 1973, abandoned.

[52] U.S. Cl. ..... 40/129 R; 40/125 N; 340/109

[51] Int. Cl.[2] ..... G09F 21/04

[58] Field of Search ..... 40/129 C, 129 R, 125 K, 40/125 H, 125 N; 116/63 P; 280/415 R, 43, 63, 491 B, 491 A; 340/82, 87, 107–109

[56] References Cited

UNITED STATES PATENTS

| | | | |
|---|---|---|---|
| 549,630 | 11/1895 | Cole | 40/125 H |
| 2,591,494 | 4/1952 | Asachika | 40/125 H |
| 3,512,288 | 5/1970 | Hall | 40/129 R |
| 3,609,898 | 10/1971 | Brown | 40/125 K X |
| 3,622,980 | 11/1971 | Elledge | 40/129 C X |

*Primary Examiner*—John F. Pitrelli
*Attorney, Agent, or Firm*—Cushman, Darby & Cushman

[57] ABSTRACT

A portable display device having a base comprising running gear which includes a plurality of wheels and a pulling tongue wherein the wheels may be detachably secured to the base such that the base may be permanently affixed to a given location. A sign is reciprocally mounted on the base by means of a supporting frame such that the sign may be raised or lowered to any desired position through the operation of a lifting mechanism in the form of a power or manually operated winch connected to the sign by a pulley and cable arrangement. Lights may be arranged on both the interior and exterior of the sign and operated by a power supply, in the form of a battery or generator which also may be carried on the base of the sign.

1 Claim, 13 Drawing Figures

INVENTOR.
KELLY R. COLEMAN

BY Law Offices of Stefan M. Stein
ATTORNEY.

FIG. 3
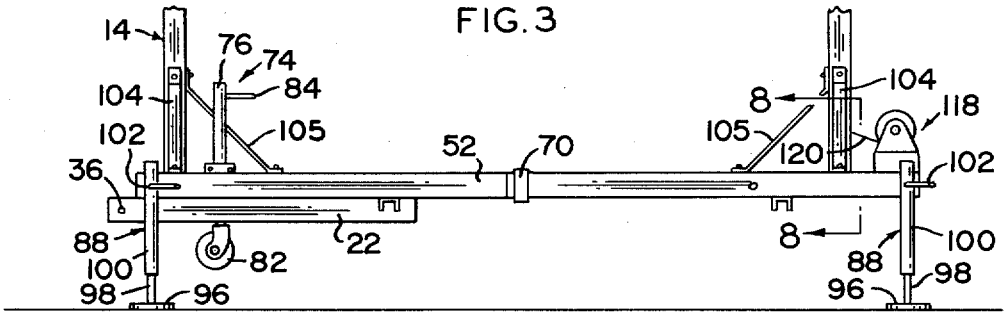
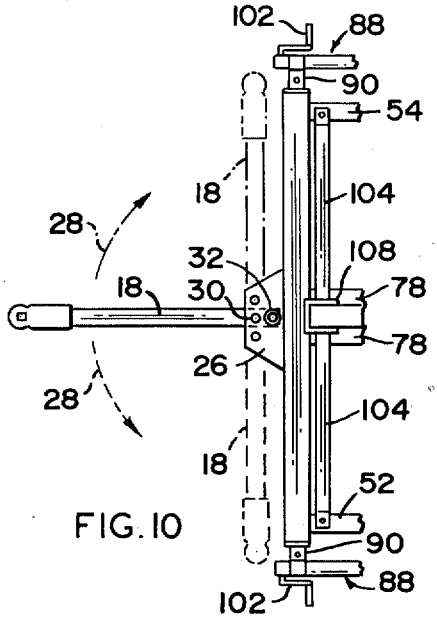
FIG. 10
FIG. 4
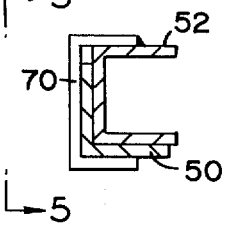
FIG. 5
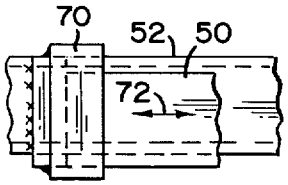
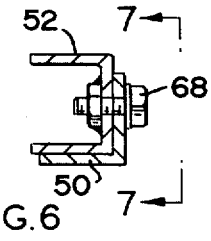
FIG. 6
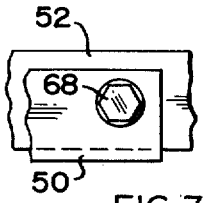
FIG. 7
FIG. 8
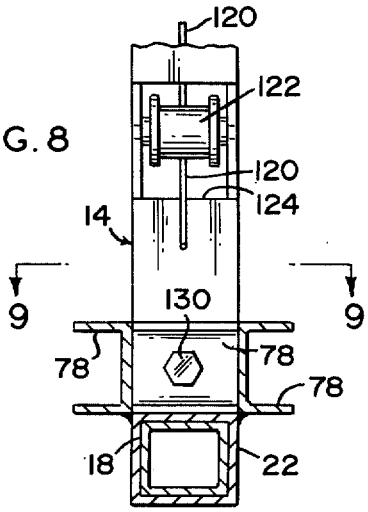
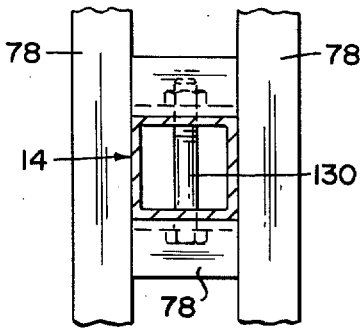
FIG. 9
INVENTOR.
KELLY R. COLEMAN
BY Law Offices of Stefan M. Stein
ATTORNEY.

FIG. 11
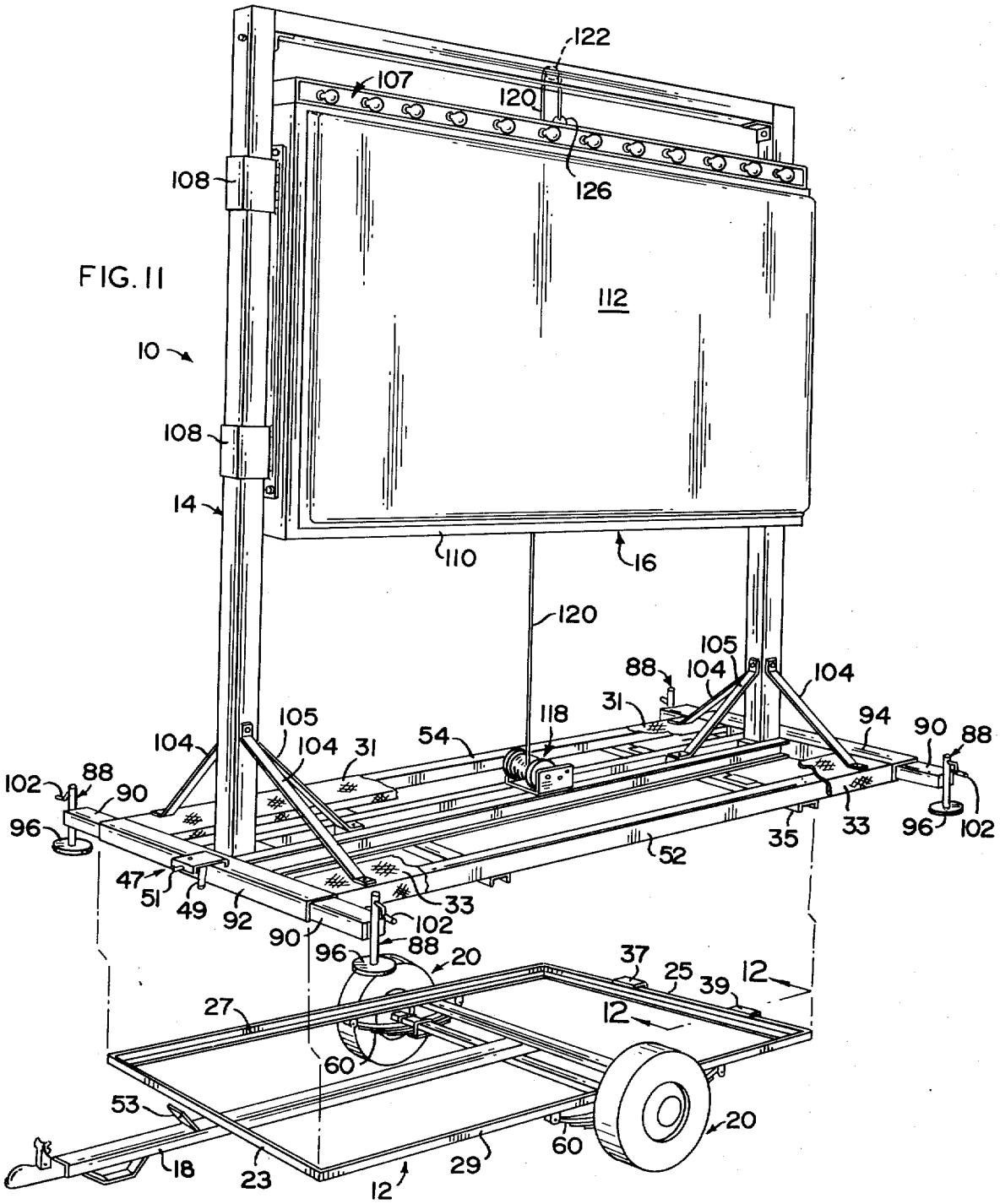
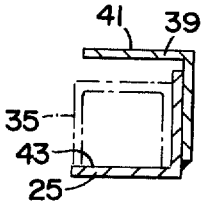
FIG. 12
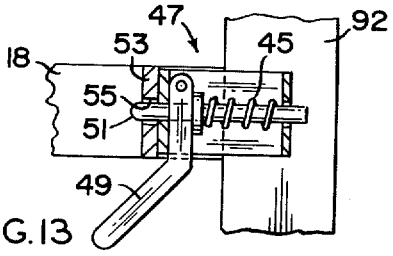
FIG. 13
INVENTOR.
KELLY R. COLEMAN
BY Law Offices of Stefan M. Stein
ATTORNEY.

DISPLAY DEVICE

Matter enclosed in heavy brackets [ ] appears in the original patent but forms no part of this reissue specification; matter printed in italics indicates the additions made by reissue.

*This is a continuation of application Ser. No. 410,305 filed Oct. 29, 1973, now abandoned.*

BACKGROUND OF THE INVENTION

1. Field of the Invention

This invention relates to a display device including an illuminated sign movably mounted on a frame so as to move in a vertical direction and including a base having running gear removably attached thereto, in order that the display device may be either portable or permanently attached at a given location.

2. Description of the Prior Art

In the advertising industry the use of display devices in the form of signs is of course extremely well known. The particular configuration or construction of the sign utilized in any given advertising application depends upon such things as types of business, goods or services being advertised, locations at which the sign or display device is to be located and the particular segment of the public to which the advertisement is directed. Because of the many diverse ways in which display devices of this type can be used, mass production of a generally standard type sign, which is to be effective for various applications, has been relatively unknown in the advertising industry.

Large scale production of a substantially standard display device is of course highly desirable in that this type of production serves to lower the cost of production. Maintenance of a standard type sign would also be less expensive since repair or servicing of such a sign could be done on a replacement part type basis.

In addition to the high cost of producing essentially custom-made signs, the cost involved in installing these signs often times equal or exceeds the cost of building the sign. This is due to the fact that up to the present time no one single sign structure has had the versatility to satisfy a wide variety of advertising applicatons. Accordingly, a custom built sign had to be produced which adapted to a particular location or business to be advertised. Consequently those involved in installing prior art signs would often times be dealing with completely different structures with which they had no general knowledge or experience. Because of the above factors the time and expense involved in the installation of conventional signs is relatively great.

Because of these and other problems prevalent in the advertising and sign making industry, there has been a long felt need for a display device which is versatile enough to be adapted to a number of varied advertising situations while at the same time having a relatively simple, low cost construction capable of being easily maintained and transported to any given location.

SUMMARY OF THE INVENTION

The present invention is directed towards a portable display device of relatively simple and inexpensive construction having sufficient versatility to be adapted to a number of varied advertising applications and eliminating the problems of transportation and installation associated with conventional prior art display devices.

More specifically, this invention comprises a base which is made portable by virtue of a running gear assembly attached thereto and comprising a plurality of detachable wheels. The running gear further includes a towing tongue adapted to connect the base to any type of conventional pulling vehicle. In that the wheels are detachably mounted to the base, the device may be towed to a desired location and permanently positioned thereat by removal of all the running gear. Base support means are provided in the form of retractable outrigger members which may extend outwardly from the front and rear cross beam members of the base, a sufficient space therefrom so as to anchor the device. This support means additionally guards against upsetting of the device during adverse weather conditions. While the running gear connected to the base may be removed, it may also remain in place on the base in supporting relation thereto if the device is intended to be positioned at a given location for only a relatively short time. In this event the pulling tongue is movably attached to the base in such a manner as to be positioned in an out-of-the-way, inoperative position. In addition, the wheels of the running gear includes locking means which prevents the wheels from rotating and, along with the outrigger members, serve to maintain the device in any given location.

This invention comprises another embodiment including structural modifications of the running gear assembly, from that described above. More specifically, the present invention is intended to include the structure wherein all of the elements of the running gear are fixedly attached to one another and removable as a unit from the base of the sign. This particular structure lends great versatility to the present invention in that the basis of the display device may be constructed to temporarily fit on a trailer comprising the permanently attached elements of the running gear. This will allow the various display devices to be towed to a location whereat the display device may be permanently positioned. Once delivered at that location, the trailer is merely detached from the base of the display device and of course may be usable to tow other display devices. In positioning or installing this type of display device at a given location, any conventional installation structure and procedure may be utilized such as embedding the display device in a permanent concrete or like base or installing the display device on an already existing structure such as a building or the like. The trailer comprising the elements of the running gear includes a frame-like structure as its supporting base wherein a U-shaped angle iron is located at the rear of the trailer and extends across its width. This angle iron has welded thereto in spaced relation to one another a plurality of L-shaped brackets. Each of these brackets define a finger or hook-like extension directed towards the front of the trailer and spaced above transverse angle iron to which they are attached to form a space in which a portion of the base of the sign is positioned. More particularly, an angle iron is correspondingly positioned across the width of the base such that a rearwardly extending ledge of the angle iron is arranged to fit in supported fashion of the top surface of the transverse angle iron of the platform by extending into the space between the bracket and the angle iron of the platform. When the base and the platform are in assembled position this structure prohibits the trailer from moving forwardly relative to the base. The base and trailer are secured together by additional means comprising a bracket mounted on the outrigger housing at the front portion of the base. This bracket includes a spring loaded pin extending forwardly of the bracket and designed to engage an aperture formed in a plate correspondingly mounted and positioned on the tongue of the trailer. When the base and the trailer are assembled the pin is biased forwardly into the aperture of the plate thereby preventing rearward movement of the trailer relative to the base. It should be further pointed out that lateral movement of the trailer relative to the base is prevented by the hook-like brackets being mounted on the rear transverse channel member of the platform in contiguous relation to the lateral support beams of the base.

The display device further comprises an illuminated sign which is mounted on an inverted U-shaped frame which itself is connected directly to the base. The sign itself is movable relative to both the frame and the base and is movably attached to the frame by means of one or more collar members fixedly attached to the periphery of the sign and surrounding correspondingly positioned legs of the frame. By being mounted in this manner, the sign is designed to move in a reciprocal fashion in a substantially vertical plane defined by the frame itself.

The sign is positioned, relative to the frame, through the use of a lifting means, including a winch, which may be operated either manually or by power through the use of an electric motor or the like. The winch may be positioned anywhere on the base in operative relation to the frame and sign. The handling means further includes a cable and pulley arrangement interconnecting the sign and the winch. This cable and pulley arrangement may be substantially mounted on the interior of the frame since ideally the frame is made from a tubular metallic construction having sufficient room on the interior of the legs of the frame to allow the positioning of such a pulley and cable arrangement. Alternatively the pulley and cable arrangement may run along the exterior of the frame and be supported from the top and legs thereof. The location of the pulley and cable arrangement is of course dependent upon location of the winch. Accordingly if the winch was located in the approximate center of the base, beneath the sign, the cable could be directed through the interior of the sign itself by means of a conduit or the like.

Lighting means in the form of a bank of incandescent or fluorescent lights may be arranged around the interior periphery of the sign. These lights may be powered by any conventional electrical power source such as a storage battery secured to the base or from any applicable source of electric current.

The invention accordingly comprises features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which:

FIG. 3 is a front view of the base means showing the running gear detached.

FIG. 4 is a sectional view taken along line 4—4 of FIG. 1.

FIG. 5 is an end view of FIG. 4 taken along line 5—5.

FIG. 6 is a sectional view taken along line 6—6 of FIG. 1.

FIG. 7 is an end view of FIG. 6 taken along line 7—7.

FIG. 8 is a sectional view of the positioning means taken along line 8—8 of FIG. 3.

FIG. 9 is a partial sectional view taken along line 9—9 of FIG. 8.

FIG. 10 is a partial top view showing one embodiment of the towing tongue and its relation to the base.

FIG. 11 is an exploded view showing the trailer and running gear removable as a unit from the base and its relation thereto when assembled.

FIG. 12 is a sectional view showing the relation of the engaging brackets and transverse angle beam of the platform and base respectively.

FIG. 13 is a top sectional view of the spring loaded bracket attached to the front of the base.

Similar reference characters refer to similar parts throughout the several views of the drawing.

DETAILED DESCRIPTION

Figures 1, 2:
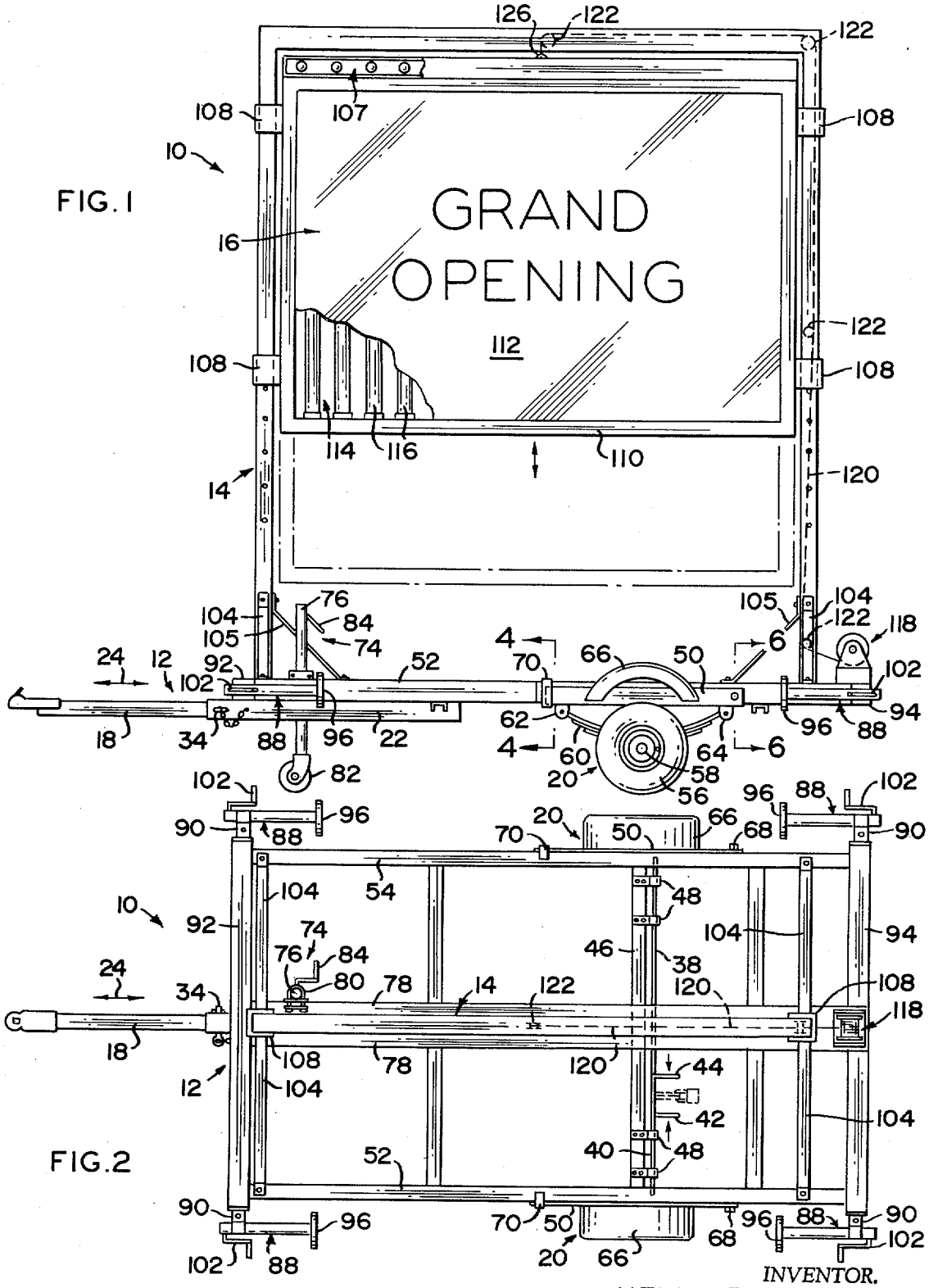
FIG. 1 is a front plane view of the display device showing the sign thereof in a raised position relative to the frame.
FIG. 2 is a top view of FIG. 1 showing the base means and support means therefor.

This invention is directed to a display device generally indicated as 10 in FIGS. 1 and 2. The device comprises a base at 12 which may be portable and which includes a support frame 14 having a sign 16 removably mounted thereon.

The base 12 may be either portable or permanently positioned at a given location by virtue of removably attachable running gear comprising pulling tongue 18 and wheel assemblies generally indicated as 20. When the display device is positioned in a desired location, the tongue 18 may be arranged in an inoperative position in that it is telescopically mounted within sleeve 22 (FIG. 3). As shown by directional arrows 24, tongue 18 may be extended or retracted into and out of operative position relative to base 12. Alternatively the tongue 18 may be pivotally or rotatably mounted to base 12 by means of outwardly extending flange 26. In this embodiment, the tongue may be swung into inoperative position, as indicated by arrows 28 about pivot point 30. When arranged in its operative position as shown in FIG. 10 its rearward extremity is located in locking means 32 as shown. As mentioned above the running gear may be completely removed from the base 12 in which case tongue 18 is detached from sleeve 22 by removing pin 34. This pin is designed to extend through aperture 36 in sleeve 22 and through a portion of the tongue 18 so as to maintain it in extended position as shown in FIG. 2.

To add versatility to the present structure this invention includes the embodiment shown in FIGS. 11–13. In this embodiment the elements of the running gear including tongue 18 and wheel assemblies 20 are all fixedly attached to one another to form a single unit generally indicated at 21. This unit is removably attached to the base of the display device and is designed to transport this base to various locations whereat the display device may be permanently affixed or installed by any conventional or desirable installation structure or technique which is available. The trailer unit 21 comprises tongue 18 being fixedly attached to the under carriage of the trailer which itself includes frame-like structure comprising front and rear transverse support beams 23 and 25. The trailer frame further includes longitudinally extending side beams 27 and 29. This trailer is designed to have mounted thereon the frame of the base of the display device which includes side beam 52 and 54 and outrigger housing 92 and 94. In the embodiment shown in FIG. 11, standing platform 31 and 33 are also provided to extend along the length of the base of the display device. The display device base further includes a transverse angle iron 35. This angle iron 35 is designed to cooperate with transverse angle iron 25 of the platform and more specifically with brackets 37 and 39 welded to transverse beam 25. It will be noted that the upper flange 41 of bracket 39 is spaced from and extended forwardly of beam 25 to provide space in which the angle iron 35 may be secured. FIG. 12 shows a sectional view of the bracket 39 when the trailer and base are positioned in assembled relation to one another. In this position the weight of the base of the display device is carried by angle iron 25 by means of the supporting engagement between lower flange 43 and angle iron 35 of the base. This assembly further prohibits the forward movement of the trailer relative to the base when the sign is being transported.

Referring to FIG. 13, a bracket generally indicated at 47 is affixed to the front, substantially center portion of the housing 92 of the front outrigger of the base. This bracket includes a lever 49 designed to operate a pin 51 which is biased by spring 45 to extend forwardly of the bracket 47 as shown in FIG. 13. An angle plate 53 (FIG. 12) is fixedly secured to tongue 18 in corresponding relation to bracket 47 such that pin 51 will engage aperture 55 formed in the plate 53. By this arrangement rearward movement of the trailer relative to the base is prohibited. It should further be noted that lateral movement between the base and trailer is prohibited in that the width of the base is dimensioned to be correspondingly positioned relative to beams 27 and 29 of the base. This construction is clearly shown in FIG. 11.

Regardless of the embodiments utilized, locking shaft 38 and 40 cooperate with wheel assemblies 20 to secure them in an immovable position thereby maintaining the sign in the desired location. This is accomplished by merely securing together handles 42 and 44 of shafts 38 and 40 respectively as shown in FIG. 2 in dotted lines. The shafts are movably connected to cross bar 46 by means of brackets 48. Each of the wheel assemblies 20 are themselves removable from the base by means of connecting bar 50 being removably attached to the correspondingly positioned, longitudinally extending side beam 52 or 54. Wheel 56 is connected to bar 50 by means of axle 58 being attached to spring means 60 which in turn are connected to fixtures 62 and 64 located at each end of spring means. As shown the fixtures 62 and 64 are connected directly to bar 50. Fender member 66 is also connected to bar 50. As stated above support bar 50 may be removed from beam 52 simply by removal of the screw and nut assembled 68 which extends through the rear end of bar 50 and into beam 52 as shown in FIGS. 1 and 6. The opposite end of bar 50 is movably secured to beam 52 by means of a U-shaped bracket 70 (FIG. 4). Bracket 70 is secured to beam 52 by a weld or other conventional means in such a manner as to allow space for the correspondingly shaped bar 50 as clearly shown in FIG. 4. This arrangement allows bar 50 to move relative to both beam 52 and bracket 70 as shown by directional arrow 72 in FIG. 5. Accordingly, upon removal of the screw and nut assembly 68 the entire wheel assembly 20 may be detached from base 12 simply by sliding support bar 50 out of engagement between beam 52 and bracket 70.

It should be noted that when the display device 10 is positioned with the wheel assembly still attached to base 12, an additional wheeled support means is provided as indicated generally at 74. This auxiliary wheel support comprises a vertically arranged shaft 76, as shown in FIGS. 1 and 2, affixed to beams 78 by means of bracket 80 so as to be movable relative to the beam 78. Wheel 82 is arranged at the lower extremity of shaft 76 to engage the ground or other support surface on which the device is positioned. Crank handle 84 may be utilized to properly position the shaft 76 relative to base 12.

Irrespective of whether or not the running gear, and in particular the wheel assembly, remains attached to the base when the device is in position, base support means comprising a plurality of outrigger members 88 are movably attached to the base by means of shafts 90. These shafts are telescopically positioned within end beams 92 and 94. Accordingly, when arranged in inoperative position shafts 90 may be housed within their corresponding beams 92 and 94. FIG. 3 shows the outrigger members in their operative position wherein shafts 90 extend outwardly from the base a sufficient distance to maintain stability of the device during adverse weather conditions. When in operative position support disc 96 of each outrigger member is extendible to a ground engaging position by virtue of its being connected to shaft 98 arranged within sleeve 100 forming the upper portion of the outrigger member 88. Vertical adjustment of base 96 can be accomplished by the manual operation of crank handle 102. Each of the outrigger members 88 is capable of moving in a horizontal and vertical direction relative to base 12 in order to properly support the display device 10 at any given location.

As stated above frame member 14 is securely attached to base 12 by means of cross beams 104 and 105 arranged in a braced relation on the frame 14 and the remaining portion of the base respectively. Frame 14 has a generally inverted U-shaped configuration and may be formed from hollow metallic beams or like material having sufficient strength to support a sign means generally indicated at 16. The sign means is movably connected to frame 14 by means of a plurality of collars 108 fixedly attached to the peripheral edges of sign 16 and arranged to surround the correspondingly positioned leg of frame 14 as shown in FIG. 1. By this arrangement the sign is capable of moving in a vertical plane substantially defined by the frame itself in a reciprocal fashion by operation of positioning means which will be described hereinafter. Therefore, it can be seen that sign 16 can be arranged in any one of various positions along the height of frame 14. This positioning feature of sign 16 greatly enhances the versatility of the subject display device in that it can be located at a number of diverse locations.

The sign itself comprises a peripheral, rectangularly shaped frame 110 designed to support display panels 112 on each side thereof. The sign means 106 is arranged such that there is sufficient space on the interior of the sign, between display panels 112 to arrange a bank 114 of lights 116. In the embodiment shown in FIG. 1 lights 116 are represented as being fluorescent. However, any applicable type light means could be substituted therefor. These lights may be powered from any conventional electrical power source such as a battery generator or which may be located directly on or independent from the rest of the display device 10. A bank of lights 107 is also mounted on the top exterior portion of the sign. These lights may be colored, flashing or arranged to form any desired configuration which will add to the attractiveness of the display device.

Sign 16 is positioned relative to frame 14 by means of positioning means as mentioned above. This positioning means comprises a winch generally indicated at 118 which may be operated either manually or by power such as an electric motor or the like. The winch 118 is connected to the sign 16 by means of a pulley and cable assembly including cable 120 and a plurality of pulleys 122. As shown in FIGS. 1 and 8 the pulley and cable arrangement may be arranged on the interior of frame 14 such that pulley 122 connects to winch 118 through aperture 124 (FIG. 8). The other end of cable 120 connects to the top of sign 16 by means of bracket 126 as shown in FIG. 1. Alternatively the cable and pulley arrangement may be arranged on the exterior of frame 14 (FIG. 11). In this embodiment, cable 120 extends up through the interior of the sign to pulley 122 mounted within sign frame 10.

FIG. 9 is a sectional view taken along line 9—9 of FIG. 8 and shows a means for attaching the legs of frame 14 to the base. This means comprises bolt and nut assembly 130 extending through the leg of frame 14 and through a cross beam 78 on the base.

It will thus be seen that the objects made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Now that the invention has been described, what is claimed is:

[1. A display device comprising: a base, a running assembly removably attached to said base, such that said display device may be portable or permanently installed on a predetermined location, a support frame mounted on said base, sign means movably mounted on said frame, positioning means connected to said sign means so as to selectively position it relative to said base, whereby said sign means may be raised or lowered on said frame relative to said base by activation of said positioning means.]

[2. A display device as in claim 1 wherein said running assembly further comprises wheel means on which said device is transported, pulling means arranged on said base so as to interconnect said device to a towing vehicle.]

[3. A display device as in claim 2 further comprising wheel connecting means including a bar connected to said wheel means and removably connected to said base, bracket means fixedly attached to said base and arranged to attach a portion of each of said bars to said base.]

[4. A display device as in claim 3 wherein said bracket is arranged relative to said base such that said bar is positionable in supported fashion between said bracket and said device.]

[5. A display device as in claim 2 wherein said pulling means comprises a tongue movably mounted on said base such that it may be positioned in either an operative or inoperative position.]

[6. A display device as in claim 5 wherein said tongue is telescopically arranged relative to a portion of said base whereby it may be selectively arranged in and out of operative position.]

[7. A display device as in claim 5 wherein said tongue is pivotally attached to said base such that it may be pivoted into an extended operative position or non-extended, inoperative position.]

[8. A display device as in claim 5 wherein said movably mounted tongue is removably attached to said base whereby said tongue is attached when permanently positioned at a desired location.]

[9. A display device as in claim 1 further including base support means movably connected to said base such that said base support means may be moved into and out of operative position, whereby proper orientation of said device is maintained when arranged in a desired position.]

[10. A display device as in claim 9 wherein said base support means comprises a plurality of outrigger assembly each of which are telescopically and rotationally connected to said base and arranged in spaced relation to one another.]

[11. A display device as in claim 10 wherein each of said outrigger assemblies comprise first and second portions movably connected to one another such that said portions can be extended or retracted into and out of operative supporting relation to one another.]

[12. A display device as in claim 1 further including guide means arranged relative to said sign means to interconnect said sign means and said frame such that said sign means is guided to move in a reciprocal fashion relative to said frame.]

[13. A display device as in claim 12 wherein said guide means comprise at least one collar fixedly attached to each side of said sign means and arranged to movably interconnect said sign means to said frame, such that said sign means is capable of moving in a reciprocal fashion relative to said frame and in a plane substantially common to said frame.]

[14. A display device as in claim 1 wherein said lift means comprises a winch, a cable means interconnecting said winch and said sign means, at least one pulley means positioned on said device between said winch and said sign means in cooperative working engagement with said cable.]

[15. A display device as in claim 14 further comprising power means including an electric motor to operate said winch.]

[16. A display device as in claim 14 wherein said cable means and said one pulley is positioned on an interior portion of said frame.]

[17. A display device as in claim 1 further comprising light means mounted on said device so as to illuminate said side means.]

[18. A display device as in claim 17 further comprising said light means arranged on said interior of said sign means.]

*19. A display device comprising: a base including an elongated frame assembly disposed in a horizontal plane, a running assembly of approximately complementary size and shape attached to said base, said running assembly including at least two ground-engaging wheels mounted on opposite sides of the running assembly for rotation about a common horizontal axis extending transversely to said running assembly, a support frame configured to define a planar disposition arranged transverse to said common axis and perpendicular to said base said support frame being mounted on said base and extending along substantially the entire length of said base and upwardly therefrom, sign means movably mounted on said support frame, said support frame disposed in at least partially surrounding relation to the outer periphery of said sign means, said sign means movably connected to move vertically in the single plane defined by said support frame along the entire length of travel of said sign means, said sign means including a continuous peripheral portion surrounding an opening, two spaced-apart panels for carrying indicia extending across said opening and supported by said peripheral portion and electric illuminating means disposed between said panels, positioning means connected to said sign means for selectively raising and lowering the latter relative to said support frame and said base, and stabilizing means carried by said base for stabilizing said base, frame and sign against tipping, said stabilizing means including ground-engageable foot members carried by said base and means for adjusting the position of the foot members inwardly and outwardly with respect to the plane of said sign.*

* * * * *